United States Patent
Yasuda et al.

(10) Patent No.: US 10,193,593 B2
(45) Date of Patent: Jan. 29, 2019

(54) SIGNAL PROCESSING DEVICE, COMMUNICATION SYSTEM, AND SIGNAL PROCESSING METHOD

(71) Applicant: NEC CORPORATION, Tokyo (JP)

(72) Inventors: Wakako Yasuda, Tokyo (JP); Kazunori Hayashi, Kyoto (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/753,694

(22) PCT Filed: Jun. 22, 2016

(86) PCT No.: PCT/JP2016/068464
§ 371 (c)(1),
(2) Date: Feb. 20, 2018

(87) PCT Pub. No.: WO2017/033550
PCT Pub. Date: Mar. 2, 2017

(65) Prior Publication Data
US 2018/0248582 A1    Aug. 30, 2018

(30) Foreign Application Priority Data

Aug. 21, 2015 (JP) ................................. 2015-163904

(51) Int. Cl.
*H04B 10/61*    (2013.01)
*H04B 3/06*    (2006.01)
(Continued)

(52) U.S. Cl.
CPC ........... *H04B 3/06* (2013.01); *H04B 10/2507* (2013.01); *H04B 10/61* (2013.01); *H04B 10/616* (2013.01);
(Continued)

(58) Field of Classification Search
CPC .... H04B 10/616; H04B 10/2507; H04J 14/06
(Continued)

(56) References Cited

U.S. PATENT DOCUMENTS

2011/0129041 A1* 6/2011 Ishihara ................ H04B 7/084
375/340
2012/0127923 A1 5/2012 Zhao et al.
(Continued)

FOREIGN PATENT DOCUMENTS

JP  2011-004264 A  1/2011
JP  2012-528523 A  11/2012
(Continued)

OTHER PUBLICATIONS

International Search Report for PCT/JP2016/068464 dated Aug. 23, 2016 [PCT/ISA/210].

*Primary Examiner* — Li Liu
(74) *Attorney, Agent, or Firm* — Sughrue Mion, PLLC

(57) ABSTRACT

A transfer function calculation unit (522) calculates a diagonal matrix G(f) on the basis of a band limit condition g(t) used in a transmission device (20). A transfer function calculation unit (524) calculates a diagonal matrix C(f) on the basis of a wavelength dispersion amount c(t) incurred in an optical transmission path. A transfer function combination unit (526) combines the diagonal matrix G(f) with the diagonal matrix C(f) so as to calculate a diagonal matrix H(f)=G(f)×C(f). An equalization coefficient calculation unit (528) calculates an equalization coefficient matrix W(f)=H$(f)^H(H(f)^H H(f)+(1/E_s)\times\Phi_\eta)^{-1}$ used in a multiplication unit (506) by using the diagonal matrix H(f). Here, H$(f)^H$ is a Hermitian transposed matrix of a matrix H(f), $E_s$ is power of an optical signal, and $\Phi_\eta$ is a diagonal matrix with N rows and N columns.

9 Claims, 8 Drawing Sheets

(51) Int. Cl.
*H04B 10/2507* (2013.01)
*H04J 11/00* (2006.01)
*H04L 27/01* (2006.01)
*H04J 14/06* (2006.01)

(52) U.S. Cl.
CPC ............... *H04J 11/00* (2013.01); *H04J 14/06* (2013.01); *H04L 27/01* (2013.01)

(58) Field of Classification Search
USPC .................................................. 398/208, 159
See application file for complete search history.

(56) References Cited

U.S. PATENT DOCUMENTS

| | | | |
|---|---|---|---|
| 2013/0195459 A1* | 8/2013 | Shieh | H04L 27/2614 398/79 |
| 2013/0272719 A1* | 10/2013 | Yan | H04B 10/2507 398/159 |
| 2016/0241341 A1* | 8/2016 | Endo | H04B 10/50 |
| 2017/0180055 A1* | 6/2017 | Yu | H04B 10/612 |

FOREIGN PATENT DOCUMENTS

| | | |
|---|---|---|
| WO | 2012/071558 A1 | 5/2012 |
| WO | 2015/075895 A1 | 5/2015 |

\* cited by examiner

SIGNAL PROCESSING DEVICE, COMMUNICATION SYSTEM, AND SIGNAL PROCESSING METHOD

CROSS REFERENCE TO RELATED APPLICATIONS

This application is a National Stage of International Application No. PCT/JP2016/068464filed Jun. 22, 2016, claiming priority based on Japanese Patent Application No. 2015-163904filed Aug. 21, 2015.

TECHNICAL FIELD

The present invention relates to a signal processing device, a communication system, and a signal processing method in which communication is performed by using a polarization-multiplexed and multi-value-modulated optical signal.

BACKGROUND ART

An amount of communication data has been increasing due to the widespread use of the Internet. In order to cope with this, it is necessary to increase the capacity of a transmission path. As one of techniques for realizing a large capacity, there is digital coherent type optical communication. In this type optical communication, light intensity information and phase information are extracted from a received signal, and are demodulated by a digital signal processing circuit.

Here, in the digital coherent type optical communication, various processes are performed in a digital domain in order to remove noise. For example, Patent Document 1 discloses a technique in which, in a case where signal transmission is performed at a speed higher than a Nyquist rate, maximum likelihood sequence estimation is performed such that a symbol determination timing is detected in order to suppress interference between codes. Patent Document 2 discloses a technique in which, in a digital filter using Fourier transform and inverse Fourier transform, in order to suppress discontinuous points in the end of a frame of inverse Fourier transform output, when frames of Fourier transform input are generated, the frames are caused to be overlapped in a fixed section.

RELATED DOCUMENT

Patent Document

[Patent Document 1] Japanese Unexamined Patent Application Publication (Translation of PCT Application) No. 2012-528523

[Patent Document 2] Japanese Unexamined Patent Application Publication No. 2011-4264

SUMMARY OF THE INVENTION

Technical Problem

In the digital coherent type optical communication, a computation amount required for noise removal in a reception device is considerably large. Thus, it is necessary to reduce the computation amount required for noise removal in order to improve a communication speed.

An object of the present invention is to reduce a computation amount required for noise removal in a reception device in digital coherent type optical communication.

Solution to Problem

According to the present invention, there is provided a signal processing device including:

an electrical signal generation unit generating an electrical signal on the basis of an optical signal which is polarization-multiplexed and multi-value-modulated and which is transmitted through an optical transmission path; and a compensation unit performing a compensation process on the electrical signal, wherein the compensation unit includes:

a Fourier transform unit performing Fourier transform on the electrical signal;

an equalization processing unit performing an equalization process on the electrical signal having undergone the Fourier transform in a frequency domain;

an inverse Fourier transform unit performing inverse Fourier transform on the electrical signal having undergone the equalization process; and an equalization coefficient setting unit setting an equalization coefficient matrix W(f) used for the equalization process, and wherein the equalization coefficient setting unit sets the equalization coefficient matrix W(f) on the basis of the following equation.

$$W(f) = H(f)^H (H(f)^H H(f) + (1/E_s) \times \Phi_n)^{-1}$$

such that $H(f) = G(f) \times C(f)$, $H^H$ is a Hermitian transposed matrix of a matrix H, $E_s$ is power of the electrical signal, and $\Phi_n$ is a diagonal matrix with N rows and N columns defined on the basis of colored noise.

G(f) is a diagonal matrix set on the basis of a band limit condition during generation of the optical signal, and C(f) is a diagonal matrix set on the basis of wavelength dispersion incurred in the optical transmission path.

According to the present invention, there is provided a signal processing device including:

an electrical signal generation unit generating an electrical signal on the basis of an optical signal which is polarization-multiplexed and multi-value-modulated and which is transmitted through an optical transmission path; and a compensation unit performing a compensation process on the electrical signal, wherein the compensation unit includes:

a Fourier transform unit performing Fourier transform on the electrical signal;

an equalization processing unit performing an equalization process on the electrical signal having undergone the Fourier transform in a frequency domain;

an inverse Fourier transform unit performing inverse Fourier transform on the electrical signal having undergone the equalization process; and an equalization coefficient setting unit setting an equalization coefficient matrix W(f) used for the equalization process, and wherein the equalization coefficient setting unit sets the equalization coefficient matrix W(f) on the basis of the following equation.

$$W(f) = W_1(f) \times W_2(f)$$

such that $W_1(f) = C(f)^1$, and $W_2(f) = G(f)^H (G(f)^H G(f) + (1/E_s) \times \Phi_n)^{-1}$ G(f)$^H$ is a Hermitian transposed matrix of a matrix G(f), $E_s$ is power of the electrical signal, and $\Phi_n$ is a diagonal matrix with N rows and N columns defined on the basis of colored noise.

G(f) is a diagonal matrix set on the basis of a band limit condition during generation of the electrical signal, and C(f) is a diagonal matrix set on the basis of a wavelength dispersion condition incurred in the optical transmission path.

According to the present invention, there is provided a communication system including:

a signal transmission device generating and transmitting an optical signal; and a signal processing device receiving and processing the optical signal, wherein the signal transmission device generates the optical signal through polarization multiplexing and multi-value modulation, and wherein the signal processing device is any of the two signal processing devices.

According to the present invention, there is provided a signal processing method of receiving and processing an optical signal, the method including:

generating the optical signal through polarization multiplexing and multi-value modulation; and processing the optical signal by using any of the two signal processing devices.

Advantageous Effects of Invention

An object of the present invention is to reduce a computation amount required for noise removal in a reception device in digital coherent type optical communication.

BRIEF DESCRIPTION OF THE DRAWINGS

The above-described object, and other objects, features and advantages will become more apparent on the basis of preferred embodiments described below and the following accompanying drawings.

DESCRIPTION OF EMBODIMENTS

Figure 1:
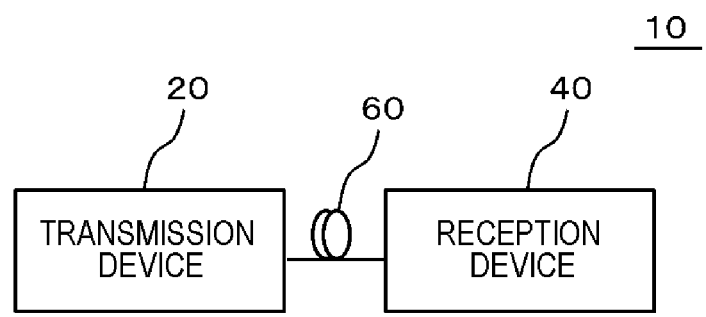
FIG. 1 is a diagram illustrating a content of a communication system according to a first example embodiment.

Hereinafter, example embodiments of the present invention will be described with reference to the drawings. The same constituent elements are given the same reference numerals throughout all the drawings, and description thereof will not be repeated as appropriate.

(First Example Embodiment)

FIG. 1 is a diagram illustrating a configuration of a communication system 10 according to the present example embodiment. The communication system 10 according to the present example embodiment includes a transmission device 20 and a reception device 40, and performs optical communication in a digital coherent method. An optical signal transmitted here is transmitted according to wavelength division multiplexing communication (WDM). The transmission device 20 modulates light serving as a carrier by using a plurality of signals to be transmitted, so as to generate an optical signal. The generated optical signal is transmitted to the reception device 40 through an optical transmission path 60. The reception device 40 demodulates the received optical signal.

The optical transmission path 60 has, for example, optical fibers. The optical signal undergoes wavelength distortion caused by wavelength dispersion when the optical signal propagates through the optical transmission path 60. The reception device 40 also performs a process for compensating for the wavelength distortion.

Figure 2:
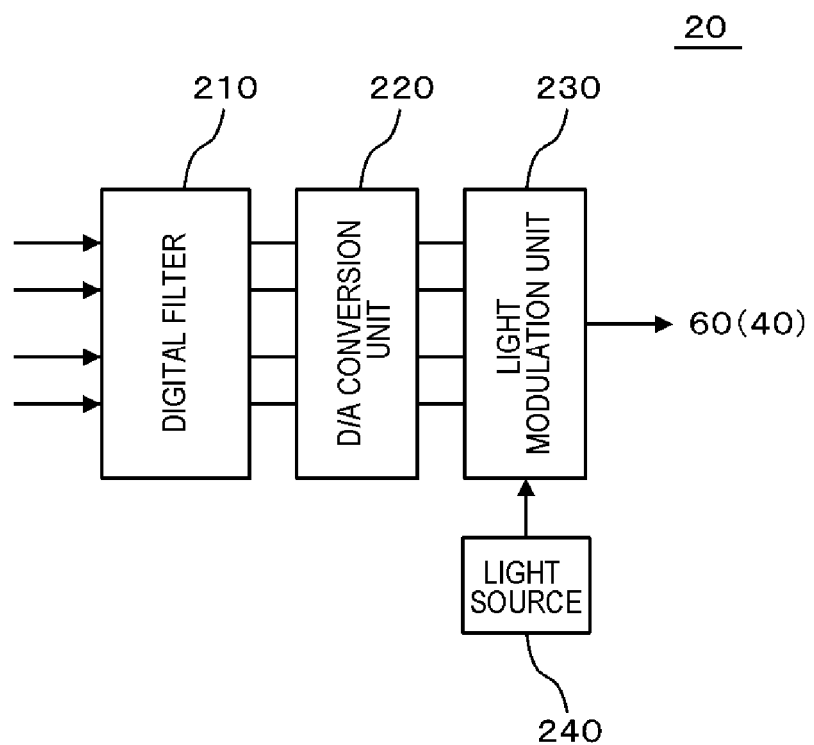
FIG. 2 is a diagram illustrating a functional configuration of a transmission device.

FIG. 2 is a diagram illustrating a functional configuration of the transmission device 20. The transmission device 20 includes a digital filter 210, a DA conversion unit 220, a light modulation unit 230, and a light source 240.

Multi-value digital signals (four-system signals in the example illustrated in FIG. 2) are input to the digital filter 210. The digital filter 210 performs a filtering process on the multi-value signals such that the multi-value signals satisfy a band limit condition required by WDM. The band limit condition applied here, that is, a band allocated to a single carrier in WDM may be set to be narrower than in, for example, a Nyquist condition (a Faster-than-Nyquist (FTN) signal). In this case, if multi-value digital signals are indicated by s(t), an impulse response of the digital filter 210 is indicated by h(t), and a symbol interval of a Nyquist rate is indicated by T_0, an output digital signal is obtained as in the following Equation (1). For example, a raised cosine filter with a roll-off rate at is used for the digital filter 210.

$$x(t) = \sum_{n=-\infty}^{N=\infty} s[n]h(t-nT) \qquad (1)$$

$$\text{s.t.} \quad T = \gamma T_0 (0 < \gamma < 1)$$

Note that the digital filter 210 may perform a process in a frequency domain by using Fourier transform (FFT) and inverse Fourier transform (IFFT), and may perform a process in a time domain by using a finite impulse response (FIR) filter.

The DA conversion unit 220 converts each of the multi-value signals output from the digital filter 210 into an analog signal. The light modulation unit 230 modulates carrier light output from the light source 240 (for example, a laser diode) on the basis of the analog signals output from the DA conversion unit 220, so as to generate an optical signal, and outputs the optical signal to the reception device 40 through the optical transmission path 60.

Figure 3:
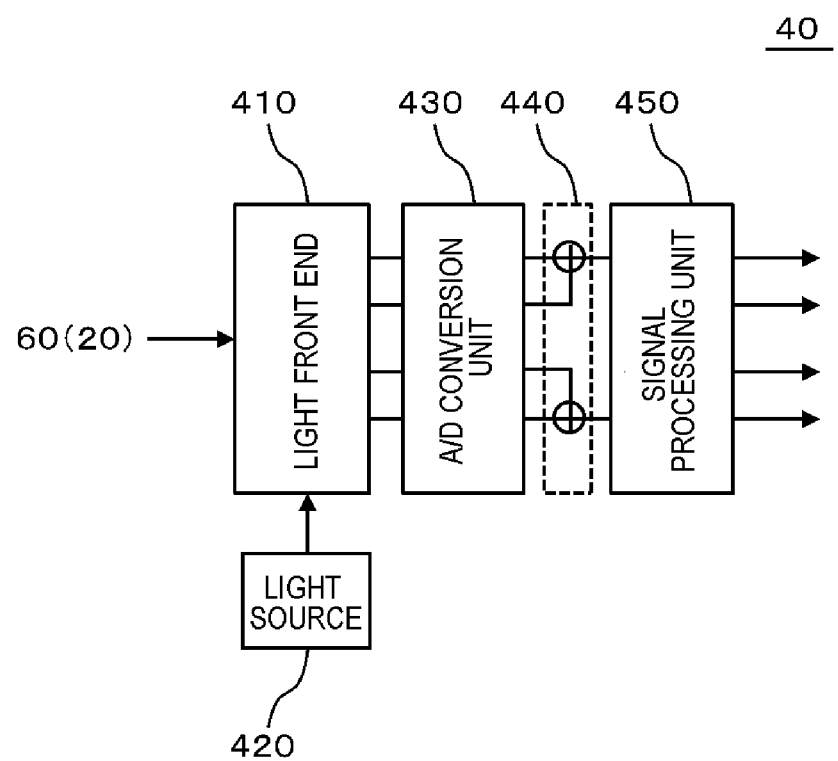
FIG. 3 is a diagram illustrating a functional configuration of a reception device.

FIG. 3 is a diagram illustrating a functional configuration of the reception device 40. The reception device 40 includes a light front end 410, a light source 420, an AD conversion unit 430, an adder unit 440, and a signal processing unit 450. The DA conversion unit 220, the adder unit 440, and the signal processing unit 450 are implemented as hardware by using, for example, integrated circuits.

An optical signal received from the optical transmission path 60 and local light from the light source 420 are input to the light front end 410. The light front end 410 causes the optical signal to interfere with the local light at a phase difference of 0 so as to generate a first optical signal (Ix), and causes the optical signal to interfere with the local light at a phase difference of π/2 so as to generate a second optical signal (Qx). The light front end 410 causes the optical signal to interfere with the local light at a phase difference of 0 so as to generate a third optical signal (Iy), and causes the optical signal to interfere with the local light at a phase difference of π/2 so as to generate a fourth optical signal (Qy). The first optical signal and the second optical signal form a set of signals, and the third optical signal and the fourth optical signal form a set of signals.

The light front end 410 includes a photoelectric conversion element. The photoelectric conversion element is provided for each of the first to fourth optical signals, and converts each of the first to fourth optical signals into an electrical signal. The four electrical signals are based on orthogonal polarization and orthogonal phases.

The light front end 410 has a filter characteristic. Assuming that the filter characteristic is, for example, a matching filter h*(−t), an electrical signal r(t) having undergone a process in the matching filter (electrical signal having undergone filter equalization) is given by the following Equation (2). Note that, in a case where a matching filter cannot be realized by the light front end 401, a matching filter may be mounted in the signal processing unit 450 in a later stage.

$$r(t) = \sum_{n=-\infty}^{n=\infty} s[n]g(t - nT) + \eta(t) \quad (2)$$

such that:

$$g(t) = \int_{-\infty}^{\infty} h(\tau)h^*(\tau-t)d\tau \quad (3)$$

$$\eta(t) = \int_{-\infty}^{\infty} n(\tau)h^*(\tau-t)d\tau \quad (4)$$

Note that n(t) indicates white noise.

The AD conversion unit 430 converts the four analog electrical signals generated by the light front end 410 into digital signals (quantization). Specifically, the AD conversion unit 430 samples the signals in a cycle T so as to quantize the signals. The quantized signal r[m]=r[mT] is expressed as in the following equation.

$$r[m] = g_0 s[m] + \sum_{n \neq m} g_{m-n} s[n] + \eta[m] \quad (5)$$

Here, $g_m=g(mT)$, and $\eta[m]=\eta(mT)$. The first term of the right side indicates a target symbol, the second term indicates inter-symbol interference, and the third term indicates a noise component.

The adder unit 440 functions as a complex signal generator, and generates two signals by processing the four digital signals generated by the AD conversion unit 430. Specifically, the adder unit 440 adds a digital signal generated from the first optical signal (Ix) to a digital signal generated from the second optical signal (Qx) so as to generate a first signal (Ex). Specifically, Ex=Ix+jQx. The adder unit 440 adds a digital signal generated from the third optical signal (Iy) to a digital signal generated from the fourth optical signal (Qy) so as to generate a second signal (Ey). Specifically, Ey=Iy+jQy.

The signal processing unit 450 processes the first signal (Ex) and the second signal (Ey) generated by the adder unit 440 so as to demodulate the four signals which have been transmitted.

Figure 4:
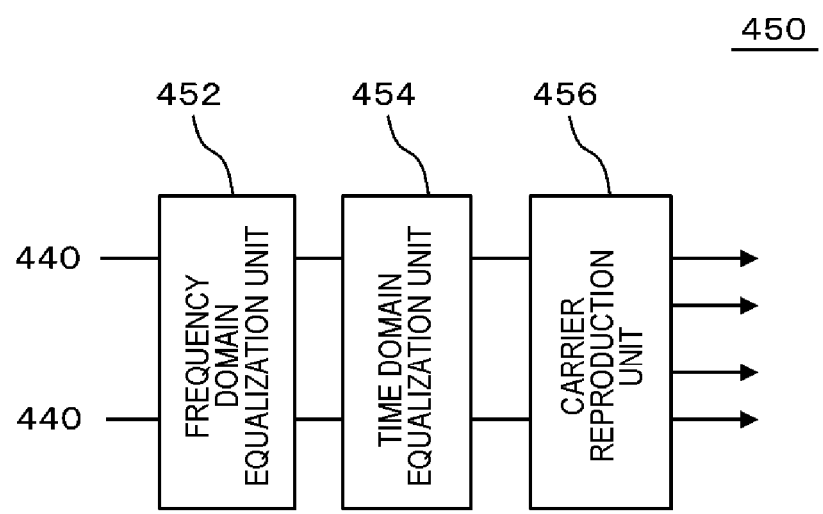
FIG. 4 is a diagram illustrating a functional configuration of a signal processing unit (compensation unit).

FIG. 4 is a diagram illustrating a functional configuration of the signal processing unit 450 (compensation unit). The signal processing unit 450 includes a frequency domain equalization unit 452, a time domain equalization unit 454, and a carrier reproduction unit 456.

The frequency domain equalization unit 452 performs an equalization process on each of the first signal and the second signal in a frequency domain. Details of the frequency domain equalization unit 452 will be described later with reference to FIG. 5.

The time domain equalization unit 454 performs an equalization process on each of the first signal and the second signal in a time domain so as to perform polarization separation. The time domain equalization unit 454 has, for example, an FIR filter. A filter coefficient applied to the FIR filter is controlled by, for example, an adaptive equalization algorithm such as a constant modulus algorithm (CMA).

The carrier reproduction unit 456 compensates for (cancels) a frequency difference and a phase difference between an optical signal received from the optical transmission path 60 and light (local light) generated from the light source 420 according to, for example, an Mth Power algorithm, and then demodulates the four transmitted signals.

Figure 5:
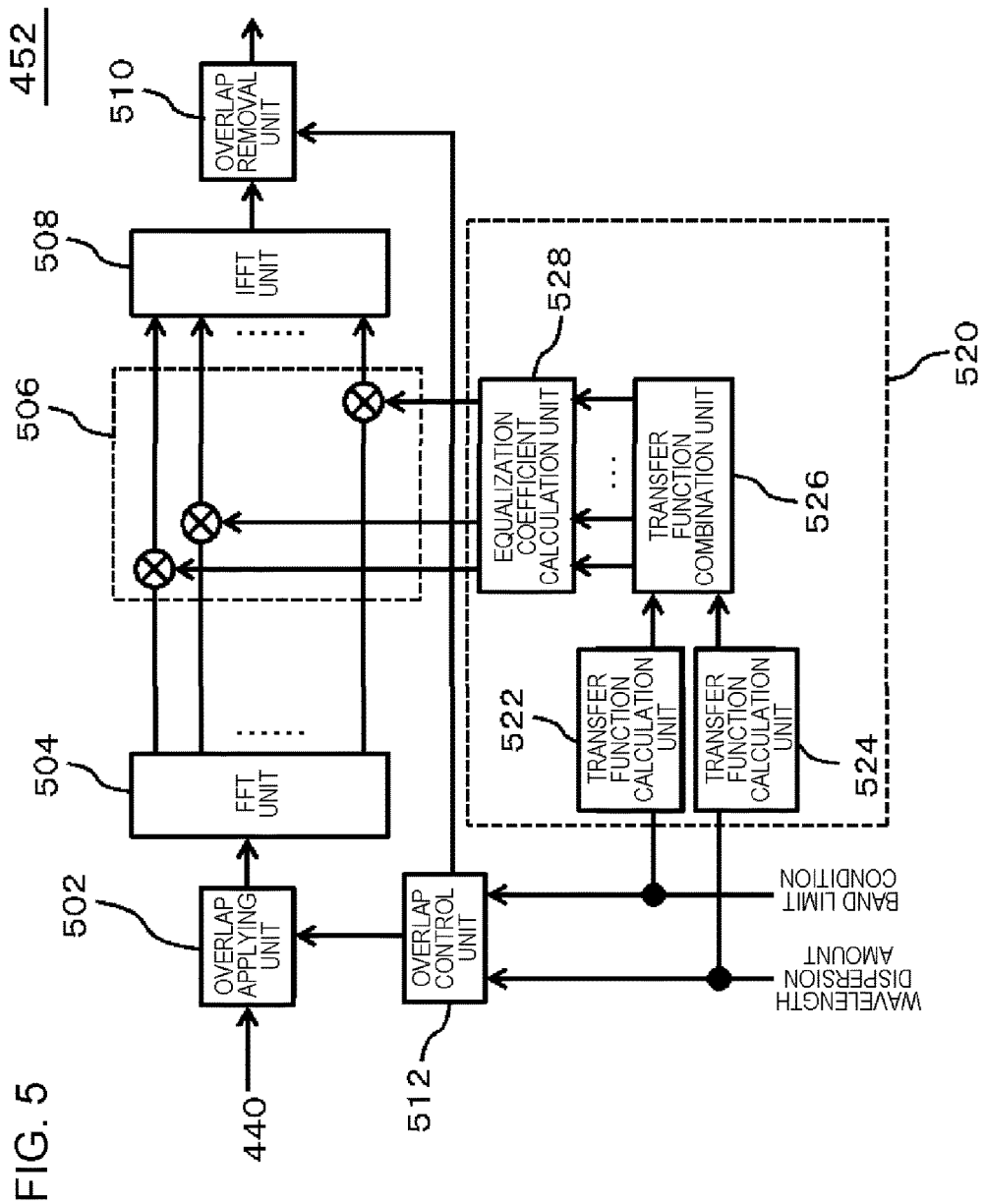
FIG. 5 is a diagram illustrating details of a frequency domain equalization unit.

FIG. 5 is a diagram illustrating details of the frequency domain equalization unit 452. The frequency domain equalization unit 452 includes a Fourier transform unit 504, a multiplication unit 506 (equalization processing unit), an inverse Fourier transform unit 508, and an equalization coefficient setting unit 520. The Fourier transform unit 504 performs a Fourier transform process on a signal (the first signal or the second signal) transmitted from the adder unit 440, and obtains a resultant signal as information on a frequency axis. Note that, when being input to the Fourier transform unit 504, the first signal and the second signal have been divided into signals in the predetermined time unit. The Fourier transform unit 504 performs the Fourier transform process on each of the separate signals (block signals which will be described later).

The Fourier transform unit 504 divides the block signals converted on the frequency axis into signals in a unit of the predetermined frequency, and outputs the signals. The multiplication unit 506 multiplies each of the signals divided in the frequency unit by an equalization coefficient so as to perform an equalization process. Note that the equalization coefficient is individually set for each separate signal. The inverse Fourier transform unit 508 combines the separate signals having undergone the equalization process, and returns combined signals to information on a time axis by performing inverse Fourier transform on the combined signals, so as to generate block signals having undergone the equalization process. An equalization coefficient in this equalization process is set according to a method which will be described later. Therefore, through the equalization process, inter-symbol interference can be removed from a received signal, and a wavelength dispersion effect can be compensated for.

The equalization coefficient setting unit 520 sets an equalization coefficient used in the multiplication unit 506. Specifically, the multiplication unit 506 includes a transfer function calculation unit 522, a transfer function calculation unit 524, a transfer function combination unit 526, and an equalization coefficient calculation unit 528.

The transfer function calculation unit 522 calculates a diagonal matrix G(f) on the basis of a band limit condition g(t) used in the transmission device 20 and the reception device 40. The transfer function calculation unit 524 calculates a diagonal matrix C(f) on the basis of a wavelength dispersion amount c(t) received from the optical transmission path. The transfer function combination unit 526 combines the diagonal matrix G(f) with the diagonal matrix C(f) so as to calculate a diagonal matrix H(f)=G(f)×C(f). The equalization coefficient calculation unit 528 calculates an equalization coefficient matrix W(f) used in the multiplication unit 506 by using the diagonal matrix H(f).

Specifically, the equalization coefficient calculation unit 528 calculates an equalization coefficient W by using the following equation. Note that, in the following equation, a plurality of equalization coefficient matrices W are collected and are indicated by a single matrix.

$$W(f) = H(f)^H (H(f)^H H(f) + (1/E_s) \times \Phi_\eta)^{-1} \quad (6)$$

Here, $H^H$ is a Hermitian transposed matrix of a matrix H, $E_s$ is power of an optical signal, and $\Phi_\eta$ is a diagonal matrix with N rows and N columns regarding noise. A diagonal component of $\Phi_\eta$ is defined on the basis of colored noise included in an optical signal. For example, a diagonal component $\Phi_\eta[k]$ (where k=0, 1, ..., N−1) of $\Phi_\eta$ is defined on the basis of the following Equation (7).

$$\Phi_\eta[k] = E\left[\frac{1}{N}\left|\sum_{m=0}^{N-1}\eta[m]e^{-j\frac{2\pi km}{N}}\right|^2\right] \quad (7)$$

$$= \frac{N_0}{N}\sum_{n=0}^{N-1}\sum_{m=0}^{N-1}g_{n-m}e^{-j\frac{2\pi(n-m)k}{N}}$$

Here, the meaning of the above equation will be described. As one of methods of calculating an equalization coefficient for minimizing a difference between a received signal and a signal (actual signal) which is input to a transmitter, there is a minimum mean square error (MMSE) method. According to this method, in a case where a noise component applied to an optical signal is assumed to be white noise on the basis of the band limit condition, an equalization coefficient $W_{white}(f)$ in the MMSE standard is calculated on the basis of the following equation.

$$W_{white}(f) = H(f)^H\left(H(f)H(f)^H + \frac{N_0}{E_s}I\right)^{-1} \quad (8)$$

Here, I indicates a unit matrix, and No indicates power of noise.

In the above Equation (6), assuming that noise is colored noise, an equalization coefficient $W_{colored}(f)$ in the MMSE standard is calculated on the basis of the following equation.

$$W_{colored}(f) = H(f)^H\left(H(f)H(f)^H + \frac{1}{E_s}DE[\eta\eta^H]D^H\right)^{-1} \quad (9)$$

Here, D is a discrete Fourier transform matrix with N rows and N columns, $\eta^H$ is a Hermitian transposed (DFT) matrix of $\eta$, and $D^H$ is an inverse DFT matrix. E[•] indicates an expected value. $W_{colored}(f)$ based on Equation (9) includes components other than a zero component in addition to a diagonal component, and thus a computation amount is increased if the above Equation (9) is used. Thus, in order to reduce a computation amount, $DE[\eta\eta^H]D^H$ in the above Equation (9) is approximated to a diagonal matrix. In the above-described way, the above Equation (6) is derived.

Note that the equalization coefficient setting unit 520 may not include the transfer function calculation units 522 and 524 and the transfer function combination unit 526. In this case, the diagonal matrix H(f) is input to the equalization coefficient calculation unit 528 from the outside of the equalization coefficient setting unit 520. The equalization coefficient setting unit 520 may not include the transfer function calculation units 522 and 524. In this case, the diagonal matrices G(f) and C(f) are input to the transfer function combination unit 526 from the outside of the equalization coefficient setting unit 520.

In the example illustrated in FIG. 5, the frequency domain equalization unit 452 includes an overlap applying unit 502, an overlap removal unit 510, and an overlap control unit 512.

The overlap applying unit 502 is provided prior to the Fourier transform unit 504, and divides an electrical signal to generate signals (hereinafter, referred to as block signals) in a unit of the process in the Fourier transform unit 504. In this case, the overlap applying unit 502 causes adjacent block signals to overlap each other.

The overlap control unit 512 controls an overlap amount applied by the overlap applying unit 502.

Figure 6:
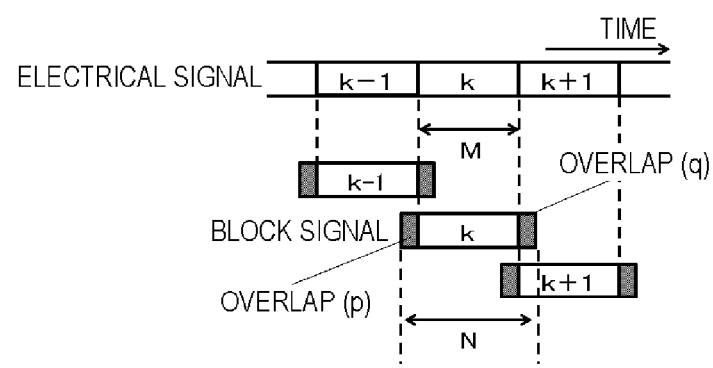
FIG. 6 is a diagram for explaining a block signal generated by an overlap control unit.

FIG. 6 is a diagram for explaining block signals generated by the overlap control unit 512. First, the overlap control unit 512 divides an electrical signal into signals at the same interval (width M in FIG. 6). The overlap control unit 512 adds an overlap part with a predetermined width (p samples in FIG. 6) to each of all separate signals. This overlap part is the same content as the p samples that are from a tail of the previous signal. The overlap control unit 512 adds an overlap part with a predetermined width (q samples in FIG. 6) to a tail of each of all separate signals. The overlap part is the same content as the q samples that are from the tail of the next signal. In the above-described way, the overlap control unit 512 generates each block signal. Note that the number of samples p and q may be equal to each other or may be different from each other.

The number of samples p and q (that is, an overlap amount) of overlap is specified by the overlap control unit 512 as described above. Here, inter-symbol interference of an electrical signal concentrates in the head and the tail of the block signal in the time axis. Thus, in a case where the overlap control unit 512 appropriately sets the number of samples p and q of overlap, the inter-symbol interference of an electrical signal is removed due to removal of the overlap part in the overlap removal unit 510. Specifically, the overlap control unit 512 sets an overlap amount by using the above-described band limit condition g(t). Specifically, in a case where a band limit is large, the overlap control unit 512 increases the number of samples p and q of overlap. On the other hand, in a case where a band limit is small, the overlap control unit 512 reduces the number of samples p and q of overlap.

Note that the overlap control unit 512 preferably sets an overlap amount not only by using the band limit condition g(t) but also by using the amount of wavelength dispersion c(t) which the optical signal incurred in the optical transmission path. Specifically, the overlap control unit 512 increases an overlap amount caused by a wavelength dispersion amount in a case where the wavelength dispersion amount is large. The overlap control unit 512 reduces an overlap amount caused by a wavelength dispersion amount in a case where the wavelength dispersion amount is small. The overlap control unit 512 adds the overlap amount based on the band limit to the overlap amount based on the wavelength dispersion amount so as to calculate the number of samples p and q of overlap used in the overlap applying unit 502 and the overlap removal unit 510.

The overlap removal unit 510 removes the overlap parts from the electrical signal (that is, the block signals) returned to information on the time axis by the inverse Fourier transform unit 508. The overlap removal unit 510 receives the widths p and q of the signals to be removed at this time from the overlap control unit 512.

As mentioned above, according to the present example embodiment, the signal processing unit 450 of the reception device 40 includes the frequency domain equalization unit 452. The frequency domain equalization unit 452 performs an equalization process on a signal received in the frequency domain. An equalization coefficient in this case is set on the basis of the above Equation (6). $\Phi_\eta$ included in the above Equation (6) is set by taking into consideration that noise included in a signal received by the reception device 40 is colored noise, and becomes a diagonal matrix through approximation. Therefore, a computation amount in the signal processing unit 450 is equal to a computation amount which is necessary in a case where noise included in a signal received by the reception device 40 is white noise, and equalization performance is improved compared with a case of using an MMSE coefficient of the related art.

Second Example Embodiment

A communication system 10 according to the present example embodiment has the same configuration as that of the communication system 10 according to the first example embodiment except for a configuration of the frequency domain equalization unit 452 of the reception device 40.

Figure 7:
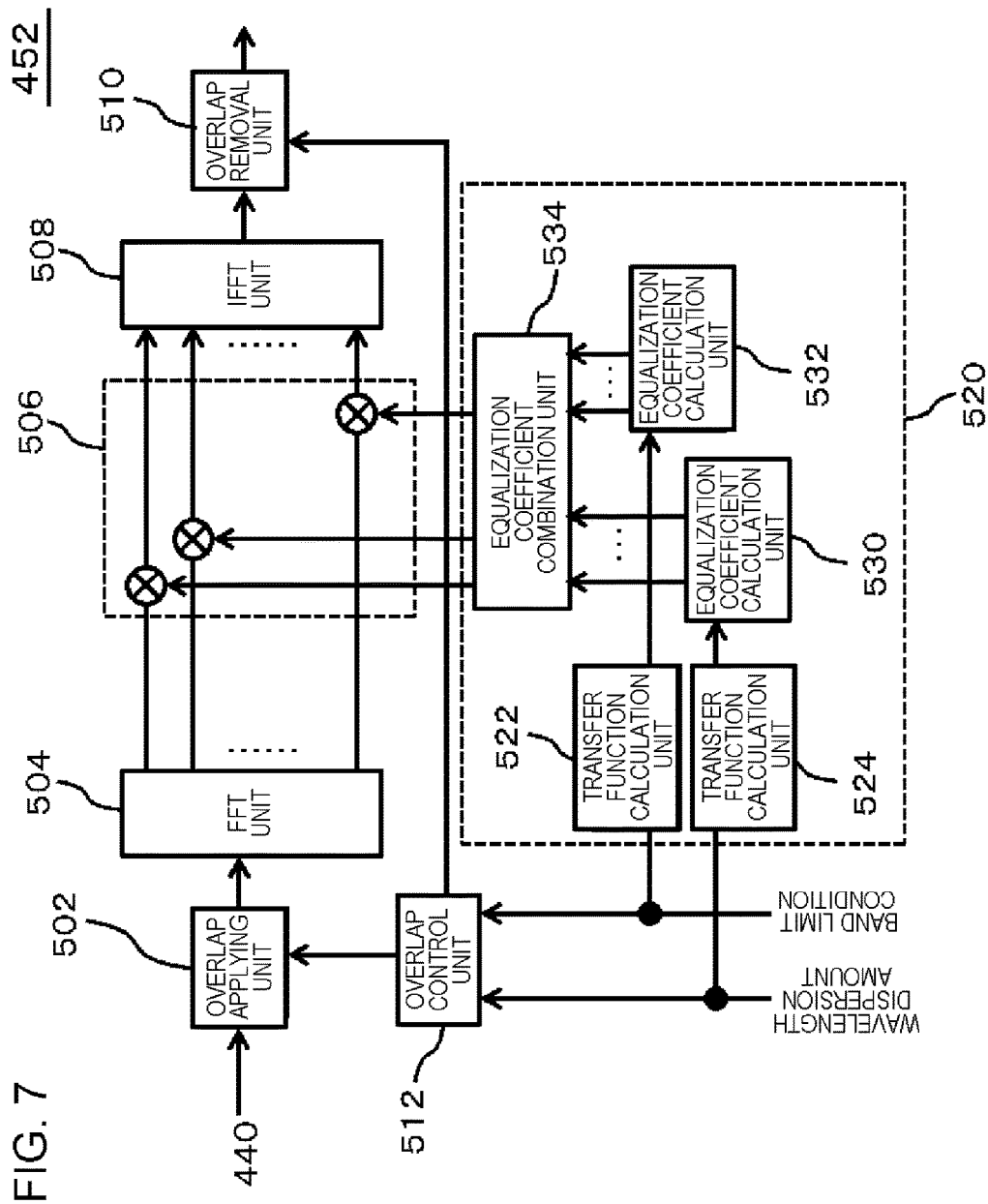
FIG. 7 is a block diagram illustrating a configuration of a frequency domain equalization unit according to a second example embodiment.

FIG. 7 is a block diagram illustrating a configuration of the frequency domain equalization unit 452 according to the present example embodiment. The frequency domain equalization unit 452 according to the present example embodiment has the same configuration as that of the frequency domain equalization unit 452 according to the first example embodiment except that an equalization coefficient calculation unit 530, an equalization coefficient calculation unit 532, and an equalization coefficient combination unit 534 are provided instead of the transfer function combination unit 526 and the equalization coefficient calculation unit 528.

The equalization coefficient calculation unit 530 calculates an equalization coefficient matrix $W_1(f)$ by using a diagonal matrix $C(f)$ which is calculated on the basis of a wavelength dispersion amount by the transfer function calculation unit 524. Specifically, the equalization coefficient matrix $W_1(f)$ is calculated according to the following Equation (10).

$$W_1(f) = C(f)^{-1} \quad (10)$$

The equalization coefficient calculation unit 532 calculates an equalization coefficient matrix $W_2(f)$ by using a diagonal matrix $G(f)$ which is calculated on the basis of band limit information by the transfer function calculation unit 522. Specifically, the equalization coefficient matrix $W_2(f)$ is calculated according to the following Equation (11).

$$W_2(f) = G^H(G(f)^H G(f) + (1/E_s) \times \Phi_\eta)^{-1} \quad (11)$$

Here, $G(f)^H$ is a Hermitian transposed matrix of a matrix $G(f)$. $E_s$ are $\Phi_\eta$ are the same as those described in the first example embodiment.

The equalization coefficient combination unit 534 combines the equalization coefficient matrix $W_1(f)$ calculated by the equalization coefficient calculation unit 530 with the equalization coefficient matrix $W_2(f)$ calculated by the equalization coefficient calculation unit 532, so as to calculate the equalization coefficient matrix $W(f)$ used in the multiplication unit 506. Specifically, the equalization coefficient combination unit 534 calculates the equalization coefficient matrix $W(f)$ according to $W(f) = W_1(f) \times W_2(f)$.

According to the present example embodiment, in the same manner as in the first example embodiment, a computation amount in the signal processing unit 450 is equal to a computation amount which is necessary in a case where noise included in a signal received by the reception device 40 is white noise, and equalization performance is improved compared with a case of using an MMSE coefficient of the related art.

Third Example Embodiment

A communication system 10 according to the present example embodiment has the same configuration as that of the communication system 10 according to the first example embodiment or the second example embodiment except for a configuration of the signal processing unit 450.

Figure 8:
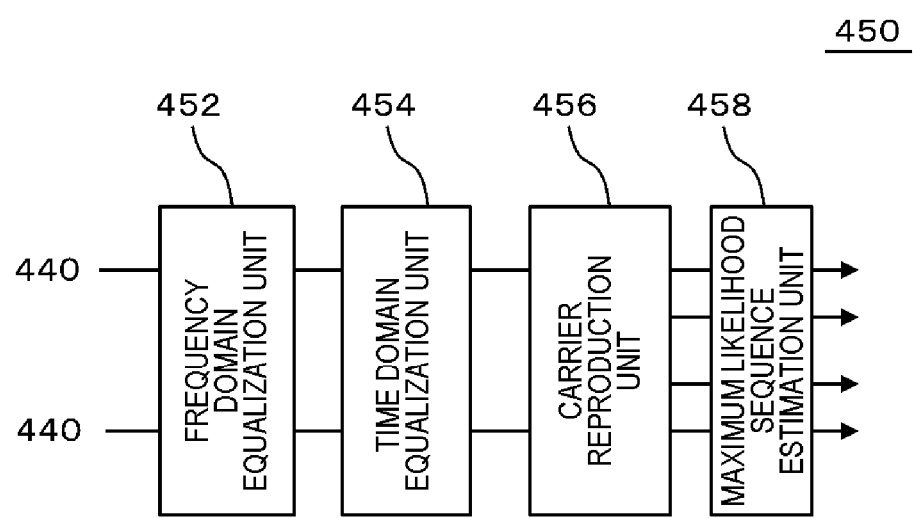
FIG. 8 is a diagram illustrating a configuration of a signal processing unit according to a third example embodiment.

FIG. 8 is a diagram illustrating a configuration of the signal processing unit 450 according to the present example embodiment. The signal processing unit 450 illustrated in FIG. 8 has the same configuration as that of the signal processing unit 450 according to the first example embodiment or the second example embodiment except that a maximum likelihood sequence estimation unit 458 is provided.

The maximum likelihood sequence estimation unit 458 performs a process (that is, a maximum likelihood sequence estimation process) based on a maximum likelihood sequence estimation (MLSE) algorithm on each of four signals demodulated by the carrier reproduction unit 456. Consequently, inter-symbol interference is further removed from each of the four signals. The maximum likelihood sequence estimation unit 458 is implemented by, for example, a circuit.

According to the present example embodiment, in the same manner as in the first example embodiment, a computation amount in the signal processing unit 450 is equal to a computation amount which is necessary in a case where noise included in a signal received by the reception device 40 is white noise, and equalization performance is improved compared with a case of using an MMSE coefficient of the related art.

The four signals demodulated by the carrier reproduction unit 456 are processed by the maximum likelihood sequence estimation unit 458, and thus inter-symbol interference is further removed from each of the four signals.

As mentioned above, the example embodiments of the present invention have been described with reference to the drawings, but these are only examples of the present invention, and various configurations other than the example embodiments may be employed.

Some or all of the above-described example embodiments may be disclosed as in the following appendixes, but are not limited to the following disclosure.

(Appendix 1)

A signal processing device including:

an electrical signal generation unit generating an electrical signal on the basis of an optical signal which is polarization-multiplexed and multi-value-modulated and which is transmitted through an optical transmission path; and a compensation unit performing a compensation process on the electrical signal, wherein the compensation unit includes:
a Fourier transform unit performing Fourier transform on the electrical signal;
an equalization processing unit performing an equalization process on the electrical signal having undergone the Fourier transform in a frequency domain;
an inverse Fourier transform unit performing inverse Fourier transform on the electrical signal having undergone the equalization process; and
an equalization coefficient setting unit setting an equalization coefficient matrix W(f) used for the equalization process, and wherein the equalization coefficient setting unit sets the equalization coefficient matrix W(f) on the basis of the following equation.

$$W(f)=H(f)^H(H(f)^H H(f)+(1/E_s)\times \Phi_\eta)^{-1}$$

such that $H(f)=G(f)\times C(f)$, $H^H$ is a Hermitian transposed matrix of a matrix H, $E_s$ is power of the optical signal, and $\Phi_\eta$ is a diagonal matrix with N rows and N columns defined on the basis of colored noise.

G(f) is a diagonal matrix set on the basis of a band limit condition during generation of the optical signal, and C(f) is a diagonal matrix set on the basis of wavelength dispersion incurred in the optical transmission path.

(Appendix 2)

A signal processing device including:
an electrical signal generation unit generating an electrical signal on the basis of an optical signal which is polarization-multiplexed and multi-value-modulated and which is transmitted through an optical transmission path; and
a compensation unit performing a compensation process on the electrical signal, wherein the compensation unit includes:
a Fourier transform unit performing Fourier transform on the electrical signal;
an equalization processing unit performing an equalization process on the electrical signal having undergone the Fourier transform in a frequency domain;
an inverse Fourier transform unit performing inverse Fourier transform on the electrical signal having undergone the equalization process; and
an equalization coefficient setting unit setting an equalization coefficient matrix W(f) used for the equalization process, and wherein the equalization coefficient setting unit sets the equalization coefficient matrix W(f) on the basis of the following equation.

$$W(f)=W_1(f)\times W_2(f)$$

such that $W_1(f)=C(f)^1$, and $W_2(f)=G(f)^H(G(f)^H G(f)+(1/E_s)\times \Phi_\eta)^{-1}$ $G(f)^H$ is a Hermitian transposed matrix of a matrix G(f), $E_s$ is power of the electrical signal, and $\Phi_\eta$ is a diagonal matrix with N rows and N columns defined on the basis of colored noise.

G(f) is a diagonal matrix set on the basis of a band limit condition during generation of the optical signal, and C(f) is a diagonal matrix set on the basis of a wavelength dispersion condition incurred in the optical transmission path.

(Appendix 3)

The signal processing device according to appendix 1 or 2, wherein a diagonal component $\Phi_\eta[k]$ (where k=0, 1, ..., N−1) of $\Phi_\eta$ is defined on the basis of the above Equation (7).

(Appendix 4)

The signal processing device according to any one of appendixes 1 to 3, wherein the compensation unit further includes:
an overlap applying unit dividing the electrical signal so as to generate block signals which are signals in a unit of a process in the Fourier transform unit such that overlap occurs in the block signals adjacent to each other; and
an overlap removal unit removing the overlap from the block signals having undergone inverse Fourier transform in the inverse Fourier transform unit, and connects the block signals after the removal to each other.

(Appendix 5)

The signal processing device according to appendix 4, wherein a magnitude of the overlap is set such that inter-symbol interference of the electrical signal is removed due to removal of the overlap in the overlap removal unit.

(Appendix 6)

The signal processing device according to appendix 4 or 5, further including an overlap control unit setting a magnitude of the overlap, on the basis of the band limit condition and a compensation amount for compensating for the wavelength dispersion.

(Appendix 7)

The signal processing device according to any one of appendixes 1 to 6, wherein the optical signal is transmitted according to wavelength division multiplexing communication (WDM), and wherein a single band in wavelength division multiplexing communication is set to be narrower than in a Nyquist condition.

(Appendix 8)

A communication system including:
a signal transmission device generating and transmitting an optical signal; and
a signal processing device receiving and processing the optical signal, wherein the signal transmission device generates the optical signal through polarization multiplexing and multi-value modulation, and wherein the signal processing device is the signal processing device according to appendix 1 or 2.

(Appendix 9)

The communication system according to appendix 8, wherein a diagonal component $\Phi_\eta[k]$ (where k=0, 1, ..., N−1) of $\Phi_\eta$ is defined on the basis of the above Equation (7).

(Appendix 10)

The communication system according to appendix 8 or 9, wherein the compensation unit further includes:
an overlap applying unit dividing the electrical signal so as to generate block signals which are signals in a unit of process in the Fourier transform unit such that overlap occurs in the block signals adjacent to each other, and
an overlap removal unit removing the overlap from the block signals having undergone inverse Fourier transform in the inverse Fourier transform unit, and connects the block signals after the removal to each other.

(Appendix 11)

The communication system according to appendix 10, wherein a magnitude of the overlap is set such that inter-symbol interference of the electrical signal is removed due to removal of the overlap in the overlap removal unit.

(Appendix 12)

The communication system according to appendix 10 or 11, further including an overlap control unit setting a magnitude of the overlap, on the basis of the band limit condition and a compensation amount for compensating for the wavelength dispersion.

(Appendix 13)

The communication system according to any one of appendixes 8 to 12, wherein the optical signal is transmitted according to wavelength division multiplexing communication (WDM), and wherein a single band in wavelength division multiplexing communication is set to be narrower than in a Nyquist condition.

(Appendix 14)

A signal processing method of receiving and processing an optical signal, the method including:

generating the optical signal through polarization multiplexing and multi-value modulation; and processing the optical signal by using the signal processing device according to appendix 1 or 2.

(Appendix 15)

The signal processing method according to appendix 14, wherein a diagonal component $\Phi_\eta[k]$ (where k=0, 1, ..., N−1) of $\Phi_\eta$ is defined on the basis of the above Equation (7).

(Appendix 16)

The signal processing method according to appendix 14 or 15, wherein the compensation unit further includes:

an overlap applying unit dividing the electrical signal so as to generate block signals which are signals in a unit of process in the Fourier transform unit such that overlap occurs in the block signals adjacent to each other, and an overlap removal unit removing the overlap from the block signals having undergone inverse Fourier transform in the inverse Fourier transform unit, and connecting the block signals after the removal to each other.

(Appendix 17)

The signal processing method according to appendix 16, wherein a magnitude of the overlap is set such that inter-symbol interference of the electrical signal is removed due to removal of the overlap in the overlap removal unit.

(Appendix 18)

The signal processing method according to appendix 16 or 17, further including an overlap control unit setting a magnitude of the overlap, on the basis of the band limit condition and a compensation amount for compensating for the wavelength dispersion.

(Appendix 19)

The signal processing method according to any one of appendixes 14 to 18, wherein the optical signal is transmitted according to wavelength division multiplexing communication (WDM), and wherein a single band in wavelength division multiplexing communication is set to be narrower than in a Nyquist condition.

This application is based upon and claims the benefit of priority from Japanese Patent Application No. 2015-163904, filed Aug. 21, 2015; the entire contents of which are incorporated herein by reference.

The invention claimed is:

1. A signal processing device comprising:

an electrical signal generation unit generating an electrical signal on the basis of an optical signal which is polarization-multiplexed and multi-value-modulated and which is transmitted through an optical transmission path; and a compensation unit performing a compensation process on the electrical signal, wherein the compensation unit includes:

a Fourier transform unit performing Fourier transform on the electrical signal;

an equalization processing unit performing an equalization process on the electrical signal having undergone the Fourier transform in a frequency domain;

an inverse Fourier transform unit performing inverse Fourier transform on the electrical signal having undergone the equalization process; and an equalization coefficient setting unit setting an equalization coefficient matrix W(f) used for the equalization process, and wherein the equalization coefficient setting unit sets the equalization coefficient matrix W(f) on the basis of the following equation:

$$W(f) = H(f)^H(f)(H(f)^H H(f) + (1/E_s) \times \Phi_\eta^{-1}$$

such that $H(f) = G(f) \times C(f)$, $H^H$ is a Hermitian transposed matrix of a matrix H, $E_s$ is power of the optical signal, and $\Phi$ is a diagonal matrix with N rows and N columns defined on the basis of colored noise, and G(f) is a diagonal matrix set on the basis of a band limit condition during generation of the optical signal, and C(f) is a diagonal matrix set on the basis of wavelength dispersion incurred in the optical transmission path.

2. The signal processing device according to claim 1, wherein a diagonal component $\Phi_\eta[k]$ (where k=0, 1, ..., N−1) of $\Phi_\eta$ is defined on the basis of the following equation:

$$\Phi_\eta[k] = E\left[\frac{1}{N}\left|\sum_{m=0}^{N-1} \eta[m]e^{-j\frac{2\pi km}{N}}\right|^2\right]$$

$$= \frac{N_0}{N}\sum_{n=0}^{N-1}\sum_{m=0}^{N-1} g_{n-m}e^{-j\frac{2\pi(n-m)k}{N}}.$$

3. The signal processing device according to claim 1, wherein the compensation unit further includes:

an overlap applying unit dividing the electrical signal so as to generate block signals which are signals in a unit of process in the Fourier transform unit such that overlap occurs in the block signals adjacent to each other; and an overlap removal unit removing the overlap from the block signals having undergone inverse Fourier transform in the inverse Fourier transform unit, and connects the block signals after the removal to each other.

4. The signal processing device according to claim 3, wherein a magnitude of the overlap is set such that inter-symbol interference of the electrical signal is removed due to removal of the overlap in the overlap removal unit.

5. The signal processing device according to claim 3, further comprising an overlap control unit setting a magnitude of the overlap, on the basis of the band limit condition and a compensation amount for compensating for the wavelength dispersion.

6. The signal processing device according to claim 1,
wherein the optical signal is transmitted according to wavelength division multiplexing communication (WDM), and
wherein a single band in wavelength division multiplexing communication is set to be narrower than in a Nyquist condition.

7. A communication system comprising:
a signal transmission device generating and transmitting an optical signal; and
a signal processing device receiving and processing the optical signal,
wherein the signal transmission device generates the optical signal through polarization multiplexing and multi-value modulation, and
wherein the signal processing device is the signal processing device according to claim 1.

8. A signal processing method of receiving and processing an optical signal, the method comprising:
generating the optical signal through polarization multiplexing and multi-value modulation; and
processing the optical signal by using the signal processing device according to claim 1.

9. A signal processing device comprising:
an electrical signal generation unit generating an electrical signal on the basis of an optical signal which is polarization-multiplexed and multi-value-modulated and which is transmitted through an optical transmission path; and
a compensation unit performing a compensation process on the electrical signal,
wherein the compensation unit includes:
a Fourier transform unit performing Fourier transform on the electrical signal;
an equalization processing unit performing an equalization process on the electrical signal having undergone the Fourier transform in a frequency domain;
an inverse Fourier transform unit performing inverse Fourier transform on the electrical signal having undergone the equalization process; and
an equalization coefficient setting unit setting an equalization coefficient matrix $W(f)$ used for the equalization process, and
wherein the equalization coefficient setting unit sets the equalization coefficient matrix $W(f)$ on the basis of the following equation:

$$W(f)=W_1(f) \times W_2(f)$$

such that $W_1(f)=C(f)^{-1}$, and $W_2(f)=G(f)^H(G(f)+(1/E_s)\times \Phi^{-1}$ $G(f)^H$ is a Hermitian transposed matrix of a matrix $G(f)$, $E_s$ is power of the electrical signal, and $\Phi_n$ is a diagonal matrix with N rows and N columns defined on the basis of colored noise, and $G(f)$ is a diagonal matrix set on the basis of a band limit condition during generation of the optical signal, and $C(f)$ is a diagonal matrix set on the basis of a wavelength dispersion condition incurred in the optical transmission path.

* * * * *

UNITED STATES PATENT AND TRADEMARK OFFICE
CERTIFICATE OF CORRECTION

PATENT NO. : 10,193,593 B2
APPLICATION NO. : 15/753694
DATED : January 29, 2019
INVENTOR(S) : Wakako Yasuda and Kazunori Hayashi It is certified that error appears in the above-identified patent and that said Letters Patent is hereby corrected as shown below:

In the Specification

Column 4, Line 39; Delete "at" and insert --α-- therefor

In the Claims

Column 14, Lines 25-26; Claim 1, delete "$W(f)=H(f)^H(f)(H(f)^H H(f)+(1/E_s)\times\Phi_\eta^{-1}$" and insert --$W(f)=H(f)^H(H(f)^H H(f)+(1/E_s)\times\Phi_\eta)^{-1}$-- therefor Column 14, Line 29; Claim 1, delete "Φ" and insert --$\Phi_\eta$-- therefor Column 16, Lines 19-20; Claim 9, delete "$W_i(f)=C(f)^{-1}$, and $W_2(f)=G(f)^H(G(f)+(1/E_s)\times\Phi^{-1}$" and insert --$W_1(f)=C(f)^{-1}$, and $W_2(f)=G(f)^H(G(f)^H G(f)+(1/E_s)\times\Phi_\eta)^{-1}$-- therefor Signed and Sealed this
Fourth Day of June, 2019

Andrei Iancu
*Director of the United States Patent and Trademark Office*